Patented Jan. 15, 1946

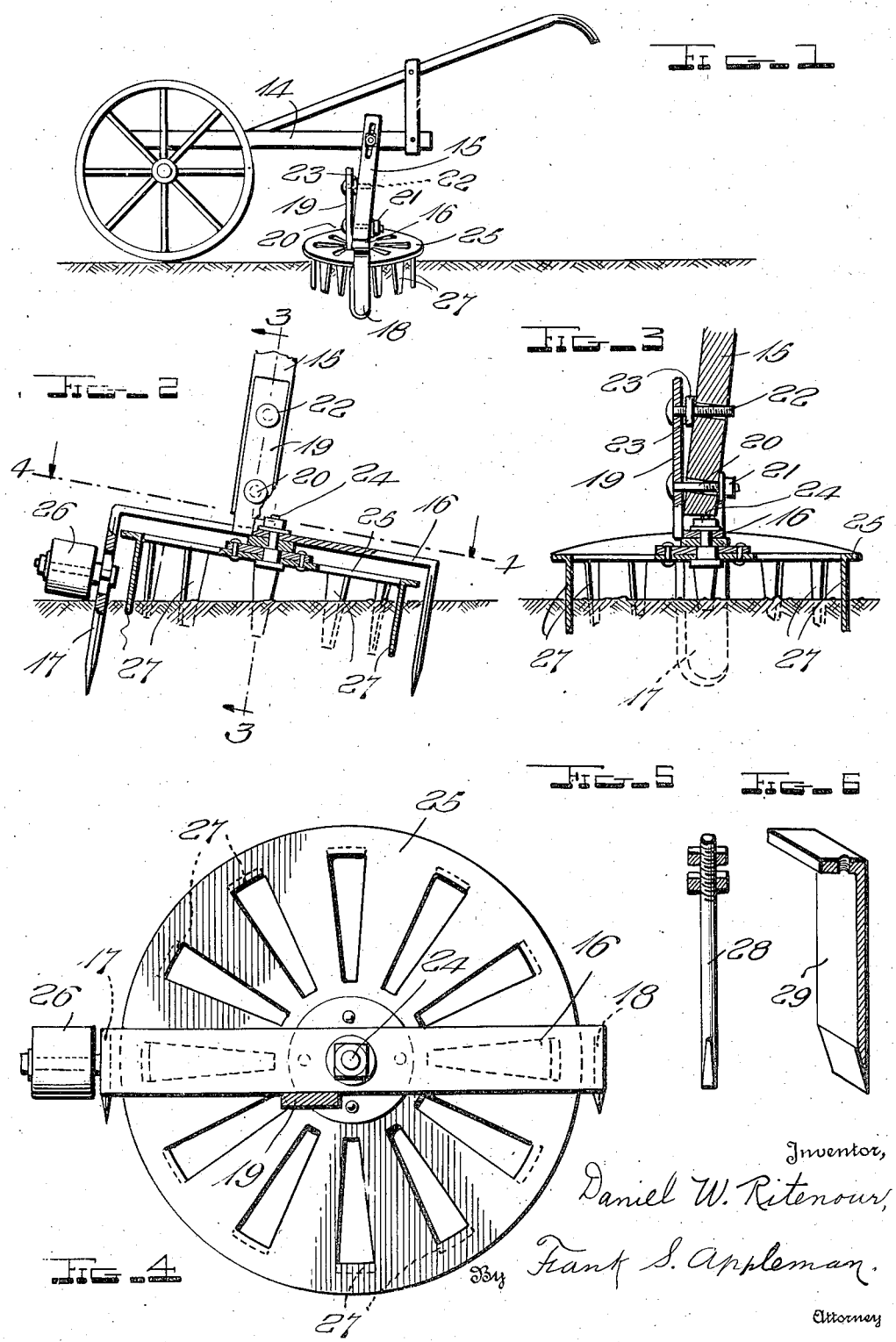

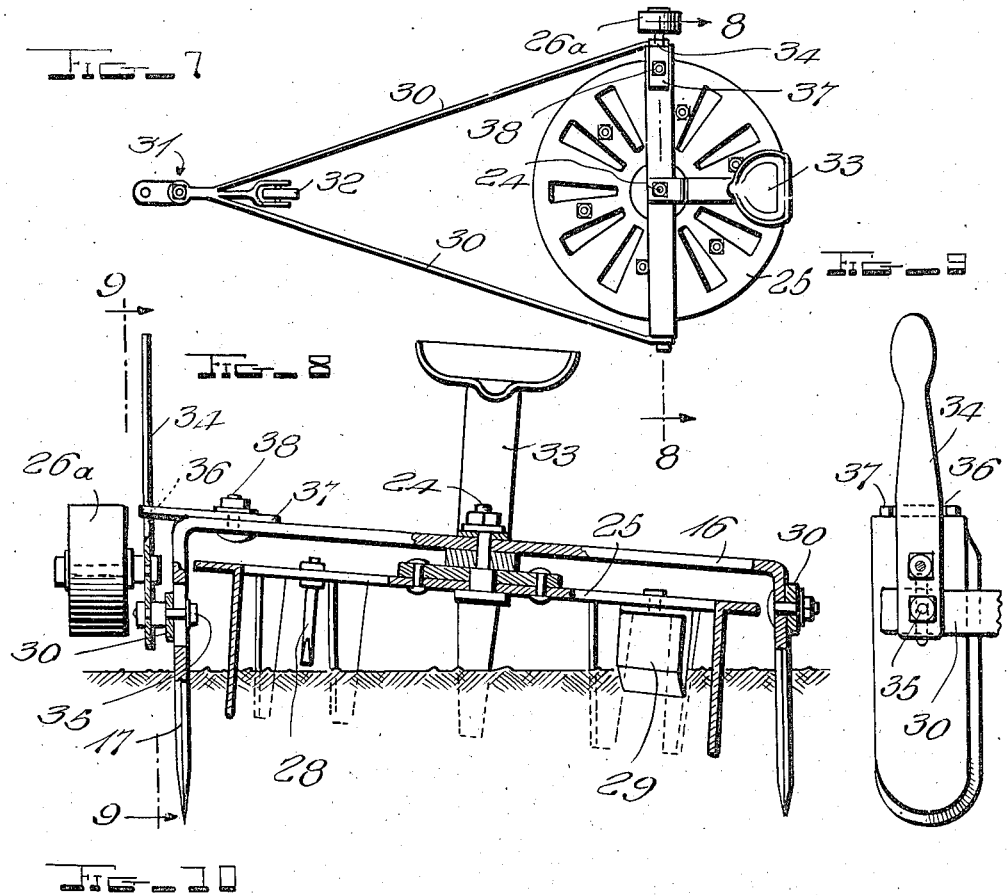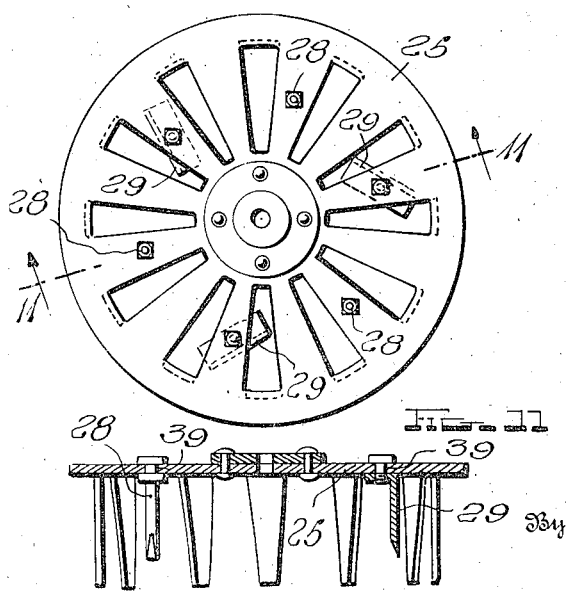

2,393,190

UNITED STATES PATENT OFFICE 2,393,190

ROTARY CULTIVATOR AND MEANS OF ATTACHMENT TO AGRICULTURAL IMPLEMENTS

Daniel W. Ritenour, Winchester, Va.

Application December 21, 1943, Serial No. 515,156

10 Claims. (Cl. 55—13)

This invention relates to rotary cultivators of a type which depends upon contact of its teeth with the soil over which it is being drawn for its rotary motion, and it is an object of the inventor to produce a cultivator of the character indicated having novel features of construction and operation, whereby the soil being treated is disintegrated and levelled so that the soil is prepared for planting of seed or the setting out of plants to afford the best condition for the development and growth of the vegetation, and the invention has been especially developed with a view of its use as an attachment for plows and agricultural implements wherein it has found a wide range of employment.

It is furthermore an object of the invention to provide a cultivator which can be employed for weeding or otherwise improving the conditions of the soil, whether they be the soil of gardens, fields, or orchards, the latter of which are very favorably affected by the use of the cultivator, owing to the fact that weeds are disturbed, broken down or removed, and the levelling of the soil of orchards causes the destruction of runways used by mice or other rodents, it being known that such runways are formed in orchards and other places by moles.

It is an object of the invention furthermore to provide a rotary earth agitator or cultivator having a guard or gauge to limit the depth which the teeth of the cultivator may penetrate on one edge so that the cultivator disk may be maintained in an inclined position. Such positioning of the disk results in lessening the resistance of the teeth on the elevated side and increasing the resistance of the teeth which more deeply penetrate the soil so that force is exerted on the lowermost teeth by the drag developed while the disk is advanced through the employment of the pushing or pulling of the structure on which the disk is rotatably mounted.

It is a further object of the invention to provide means by which the disk is mounted on the standard or standards of a single or double shovel plow, or the cultivating disk or disks may be associated with means by which it may be hitched to a truck or a tractor, or rigging may be provided for making it horse or animal drawn, or it may be attached to a hand rake handle.

A still further object of the invention is to provide a cultivating disk having attachments for cutting weeds or vegetation and for increasing the rotating force developed during the travel of the disk.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 illustrates a view in side elevation of a plow frame having the cultivating disk applied to the standard thereof;

Figure 2 illustrates a transverse sectional view of the cultivator with the standard in elevation;

Figure 3 illustrates a transverse vertical section on the line 3—3 of Fig. 2;

Figure 4 illustrates a horizontal sectional view of the cultivator disk and its mounting taken on the line 4—4 of Fig. 2;

Figure 5 illustrates a sectional perspective view of a removable tooth;

Figure 6 illustrates a sectional perspective view of a weed cutting blade;

Figure 7 illustrates a plan view showing the assembly of the disk with parts for coupling it to a tractor or the like;

Figure 8 illustrates an enlarged transverse vertical sectional view on the line 8—8 of Fig. 7;

Figure 9 illustrates a detail view of the gauge wheel and its mounting, taken substantially on the line 9—9 of Fig. 8;

Figure 10 illustrates a plan view of the disk showing the cutter blades and auxiliary teeth; and Figure 11 illustrates a sectional view on the line 11—11 of Fig. 10.

In these drawings 14 denotes the frame or beam of an ordinary shovel plow or cultivator having a standard 15, to which a cultivating disk is attached; the said cultivator in the present embodiment of the invention comprising a plate 16 with right angularly disposed extensions 17 and 18 at its ends, which extensions penetrate the soil as the cultivator is used and preferably the advancing edges of the extensions are sharpened so that they will more readily move in the soil as the cultivator is advanced, and aside from the other functions, they aid in guiding the cultivator and preventing lateral movement of the cultivator. An arm 19 is preferably integral with the plate 16 and it is provided with a threaded stud 20 which is applied to an aperture of the standard 15 and it is held therein by a nut 21 which serves to bind the arm to the standard. The arm is also provided with a second threaded stud 22 which is intended to enter another aperture in the standard. A nut 23 is threaded on the stud 22 and is adjustable thereon so that it abuts the outer surface of the standard when the arm 19 is in a vertical position. By this means the cultivator may be adjusted to standards of different inclinations or curvatures, and the arm can be maintained in a vertical position practically regardless of the shape of the standard.

The plate 16 is provided with an aperture to receive a stud 24 on which a disk 25 is rotatable, it being shown that the stud has a round shoulder on which the disk may turn. The arm 19 is connected to the plate at one side of the stud and it is toward the end of the plate 16 which is maintained on a higher plane than that of the other end of the plate, and arrangement which provides for increasing the drag or power due to the increased depth of penetration of the teeth at the lower end of the plate, and to insure this increased depth of penetration a gauge roller 26 is rotatably mounted on the angular end 17 of the plate and it rides on the surface of the soil being cultivated so that the cultivator is maintained in the angularly disposed position in which it is shown in Fig. 2.

Reference has been made to teeth on the disk 25 and these teeth 27 are preferably stamped from the disk and bent downwardly as illustrated in the drawings, but in order to increase the drag and consequently the force which turns the disk, additional spikes or teeth such as 28 may be employed, as will presently appear and, in this connection, it may be stated that cutting blades 29 may be attached to the under side of the disk to act as weed cutters which will operate during the rotation of the disk.

In the modification shown in Fig 7, the parts are assembled in connection with a yoke 30 by which a draft rigging 31 is provided for connecting it to a truck or tractor by which the cultivator can be drawn or propelled, and a suitable caster 32 of known type is effective to hold the yoke in a substantially horizontal position and to maintain the cutter on a proper plane with respect to the soil to be treated. This modified form is also further enlarged upon in Fig. 8, wherein a seat 33 may be installed on the stud on which the cutter disk rotates and this also illustrates the spikes or teeth and the cutting blades installed. The spikes and blades may be increased or diminished in number, according to the requirements in practice, and the inventor does not wish to be limited with respect to those features in this respect. In this modification, a gauge roller 26a is rotatably mounted on an arm 34 which is oscillatively mounted on a stud 35 in the angularly disposed extension of the plate 16, and the said arm may be sprung into a recess 36 in the end of a plate 37 secured on the bolt 38, as shown in Fig. 8. The mounting of the roller 26a in the manner stated allows for its movement for clearing grass or other foreign substances by springing the arm 34 clear of the recess 36 and swinging the arm on the pivot or stud 35.

It is seen that the cutting blades and spikes are secured by fastenings of appropriate nature lodged in apertures such as 39, a plurality of which is formed in the disk between the apertures created when the teeth of the cultivator are cut or stamped therefrom.

Provision is made for adjusting the stud 35 in a slot formed in the extension 17 of the arm 16 so that the depth at which the disk may operate may be controlled.

While Figure 1 has been shown as embodying a push cultivator, it is obvious that draft rigging may be provided at the end of the beam for other propelling attachment.

From what has been stated, it will be apparent that its use as an attachment for agricultural implements in general gives it a wide applicaton in farming, orchard treatment and other phases which those skilled in the art will understand and appreciate, it being noted that the dimensions of the several disks on which the teeth are formed may be unlimited, within predetermined bounds, so that it may be used as a hand tool in gardening or as a power driven medium.

I claim:

1. A rotary cultivator comprising a suitable frame, a standard depending therefrom, an arm adjustably fixed on the standard, a plate having depending ends carried by said arm, a disk rotatably mounted on the plate, said disk having teeth depending therefrom, operative to rotate the disk and agitate soil as the cultivator is propelled, the depending ends of the plate extending below the plane of the teeth.

2. A rotary cultivator comprising a suitable frame, a standard depending therefrom, an arm adjustably fixed on the standard, a plate having depending ends carried by said arm, a disk rotatably mounted on the plate, said disk having teeth stamped therefrom, operative to rotate the disk and agitate soil as the cultivator is propelled, and means on one of the depending ends of the plate for limiting the penetrating depth of the said depending end in order that the cultivator may be maintained in an inclined position during its operation.

3. A rotary cultivator comprising a suitable frame, a standard depending therefrom, an arm having threaded studs, one of which is adapted to project through the standard and be secured thereon by a nut engaging the protruding end of the stud, a nut threaded on the other stud and adjustable thereon for limiting the degree which the said stud may penetrate the standard for the purpose of maintaining the arm in a vertical position, regardless of the inclination of the standard, a plate carried by the arm and extending transversely thereof, said plate having depending ends, a disk having teeth located between the depending ends of the plate, a stud on which the disk is rotatable, and means for anchoring the stud to the plate.

4. A rotary cultivator comprising a suitable frame, a standard depending therefrom, an arm having threaded studs, one of which is adapted to project through the standard and be secured thereon by a nut engaging the protruding end of the stud, a nut threaded on the other stud and adjustable thereon for limiting the degree which the said stud may penetrate the standard for the purpose of maintaining the arm in a vertical position, regardless of the inclination of the standard, a plate carried by the arm and extending transversely thereof, said plate having depending ends, a disk having teeth located between the depending ends of the plate, a stud on which the disk is rotatable, means for anchoring the stud to the plate, and a gauge roller carried by one of the arms for determining the depth of penetration of the arm on which the gauge is carried.

5. A rotary cultivator comprising a suitable frame, a standard depending therefrom, an arm having threaded studs, one of which is adapted to project through the standard and be secured thereon by a nut engaging the protruding end of the stud, a nut threaded on the other stud and adjustable thereon for limiting the degree which the said stud may penetrate the standard for the purpose of maintaining the arm in a vertical position, regardless of the inclination of the standard, a plate carried by the arm and extending transversely thereof, said plate having depending ends, a disk having teeth located between the depending ends of the plate, a stud on which the disk is rotatable, means for anchoring the stud to the plate, a gauge roller carried by one of the arms for determining the depth of penetration of the arm on which the gauge is carried, auxiliary teeth removably secured on the disk, and weed cutting blades secured to the disk and projecting downwardly therefrom.

6. A cultivator comprising a plate having depending ends, a disk rotatably suspended under the plate, teeth struck from the plate and extending downwardly therefrom, means for propelling the cultivator, and a gauge roller mounted on one of the depending ends of the plate adapted to engage the soil for limiting the depth of operation of the teeth at one end of the plate.

7. A cultivator comprising a plate having depending ends, a disk rotatably suspended under the plate, teeth struck from the plate and extending downwardly therefrom, means for propelling the cultivator, a lever oscillatively mounted on one of the depending ends of the plate, a gauge roller carried by said lever, and means for holding the lever in one position of adjustment during the operation of the gauge roller.

8. A cultivator comprising a plate having depending ends, a disk rotatably suspended under the plate, teeth struck from the plate and extending downwardly therefrom, means for propelling the cultivator, a lever oscillatively mounted on one of the depending ends of the plate, a gauge roller carried by said lever, means for holding the lever in one position of adjustment during the operation of the gauge roller, auxiliary teeth removably secured to the plate, and grass cutting blades secured to the plate and projecting thereunder.

9. A rotary cultivator comprising a plate having depending ends, a disk having depending teeth, a stud carried by the plate on which the disk is rotatably mounted, an arm connected to the plate to one side of the stud on which the disk is rotatable, means for connecting the arm to a standard of a cultivator, and a gauge roller on one of the depending ends of the plate for limiting the penetration of the teeth of the disk at one end of the plate.

10. A rotary cultivator comprising a plate having depending ends, a disk rotatably mounted under the plate, said disk having teeth stamped therefrom, operative to rotate the disk and agitate soil as the cultivator is propelled, means for limiting the depth of penetration of the teeth on one end of the plate, and means for attaching the rotary cultivator to agricultural implements for propelling the cultivator.

DANIEL W. RITENOUR.